(12) United States Patent
Doering

(10) Patent No.: US 9,508,034 B2
(45) Date of Patent: Nov. 29, 2016

(54) MULTI-FREQUENCY BULK RFID TAG COMMISSIONING

(71) Applicant: Checkpoint Systems, Inc., Thorofare, NJ (US)

(72) Inventor: Heiko Doering, Wald-Michelbach (DE)

(73) Assignee: CHECKPOINT SYSTEMS, INC., Thorofare, NJ (US)

(*) Notice: Subject to any disclaimer, the term of this patent is extended or adjusted under 35 U.S.C. 154(b) by 978 days.

(21) Appl. No.: 13/622,609

(22) Filed: Sep. 19, 2012

(65) Prior Publication Data

US 2013/0088336 A1    Apr. 11, 2013

Related U.S. Application Data

(60) Provisional application No. 61/543,454, filed on Oct. 5, 2011.

(51) Int. Cl.
| | |
|---|---|
| *H04Q 5/22* | (2006.01) |
| *G08B 13/14* | (2006.01) |
| *G01S 13/74* | (2006.01) |
| *G06F 7/08* | (2006.01) |
| *G06F 17/00* | (2006.01) |
| *G06K 19/07* | (2006.01) |
| *G06K 7/10* | (2006.01) |

(52) U.S. Cl.
CPC ....... *G06K 19/0723* (2013.01); *G06K 7/10069* (2013.01); *G06K 19/0724* (2013.01)

(58) Field of Classification Search
CPC ........... G06K 19/0723; G06K 7/0008; G06K 19/07749; G08B 13/2442; G07F 7/1008; G06Q 30/02
USPC ............... 340/10.51, 10.1, 572.2, 10.2, 10.3, 340/10.4, 572.1, 572.7; 342/42, 44; 235/380, 375
See application file for complete search history.

(56) References Cited

U.S. PATENT DOCUMENTS

| | | | | |
|---|---|---|---|---|
| 5,477,215 | A  * | 12/1995 | Mandelbaum ....... | G06K 7/0008 235/380 |
| 6,377,203 | B1* | 4/2002 | Doany ................. | G06K 7/0008 340/10.1 |
| 7,659,822 | B2 | 2/2010 | Carrender et al. | |
| 7,737,824 | B2 | 6/2010 | Aikawa et al. | |
| 2005/0167497 | A1 | 8/2005 | Fujii | |
| 2006/0006986 | A1* | 1/2006 | Gravelle .............. | G06K 7/0008 340/10.3 |
| 2006/0267733 | A1* | 11/2006 | Steinke ................ | G06K 7/0004 340/10.1 |
| 2007/0046436 | A1* | 3/2007 | Tanaka ................. | G06K 7/0008 340/10.2 |
| 2007/0069859 | A1* | 3/2007 | Bae ....................... | H04B 5/0062 340/10.1 |
| 2007/0126585 | A1* | 6/2007 | Okunev ................ | G06K 7/0008 340/572.7 |
| 2007/0207744 | A1* | 9/2007 | Rofougaran .......... | H04B 1/406 455/73 |
| 2008/0136643 | A1* | 6/2008 | Yeo ..................... | G06K 19/0723 340/572.2 |
| 2009/0021353 | A1 | 1/2009 | Nonaka | |
| 2009/0033493 | A1* | 2/2009 | Lin ...................... | G06K 7/0008 340/572.1 |
| 2009/0167496 | A1* | 7/2009 | Norman ............. | G06K 19/0723 340/10.1 |
| 2009/0303016 | A1 | 12/2009 | Deuber et al. | |
| 2010/0102933 | A1* | 4/2010 | Hsieh .................. | G06K 7/0008 340/10.2 |
| 2010/0182128 | A1* | 7/2010 | Kim ..................... | G06K 7/0008 340/10.2 |
| 2012/0068829 | A1* | 3/2012 | Shi ..................... | G06K 7/10019 340/10.2 |

* cited by examiner

*Primary Examiner* — George Bugg
*Assistant Examiner* — Munear Akki
(74) *Attorney, Agent, or Firm* — Nelson Mullins Riley & Scarborough, LLP

(57) ABSTRACT

A system and method for the rapid bulk commissioning of RFID tags includes exploiting simultaneous writing of plural tags via isolated communications bands, avoiding write acknowledgement, collision/retransmission, and other delays.

18 Claims, 3 Drawing Sheets

MULTI-FREQUENCY BULK RFID TAG COMMISSIONING

CROSS-REFERENCE TO RELATED APPLICATION(S)

This application claims the benefit of the earlier filing date of U.S. Provisional Patent Application No. 61/543,454 filed on Oct. 5, 2011, the entire disclosure of which is hereby incorporated by reference herein as if being set forth in its entirety.

BACKGROUND

The disclosure relates generally to the field of radio-frequency identification (RFID) and particularly to the bulk commissioning of RFID tags.

RFID tags may be programmed in any of a variety of ways. Many tags are capable of self-programming through the use of an air communications protocol that includes a write command and onboard permanent or semi--permanent memory writing capability. Data can be stored on these tags by establishing a communication link to the reader, issuing the write command, and waiting for the tag to complete its programming.

RFID tags may be active (i.e., having their own power source, such as a battery), or passive (i.e., relying on power received from the reader), or some combination of active and passive. Passive tags typically require that they receive signal from the reader continuously during the write process. Loss of transmission can mean loss of power and therefore a failure in writing the particular data to memory. To inform the reader of the status of an attempted write, passive tags typically respond with a notification to the reader once writing is complete.

The efficiency of utilization readers for the programming of large numbers of tags depends upon the manner in which communications between the readers and the tags is conducted and coordinated. This disclosure relates to a new method for ensuring rapid and effective programming utilizing plural regulatory communications bands.

U.S. Pat. No. 7,659,822 (Carrender, et al.), titled "Method and apparatus for testing RFID devices", describes a method and apparatus for testing RFID straps. Arrays of RFID straps in a roll-to-roil process are coupled to an array of test elements. RF programming and interrogation signals are frequency and time multiplexed to the RFID array. Return signals are detected to determine sensitivity and programmability parameters of the RFID straps. In one embodiment, the signal sources may be RFID readers or transceivers configured to operate at m different frequency channels within an RFID band. Further, these frequencies may be chosen to maximize the frequency separation of nearest columns of test elements and next nearest columns in a specified operating frequency band.

U.S. Patent Application US 200910303016 A1 (Deuber. et al.), titled "Method for commissioning an RFID network", describes a method for implementing an RFID network whereby: each read-write station transmits at least one test signal; each read-write station receives the (receivable) test signals of neighboring read-write stations, said signals comprising a station address, a frequency channel number and a measured signal intensity of each receivable neighboring read-write station; a network structure comprising structure data and a coordination plan comprising co-ordination data are calculated using a number of time slots and a number of frequency channels, as service frequency channel (reader service channel, RSK) and/or a service time slot (reader service time, RST) being defined and used by the read-write stations for service purposes; and at least corresponding structure data and co-ordination data for an organized, synchronous network operation is transmitted to the read-write stations so that said stations do not interfere with one another.

The inventor notes that such prior solutions fail to take advantage of plural regulatory bands for communication being available. Under the proper circumstances, all bands may be used in a single jurisdiction. To use the Japanese band in the United States, in addition to the U.S. band, it is merely necessary, for instance, to either obtain an emissions waiver tear the appropriate governmental authorities, distance the broadcast equipment from devices in danger of interference, or shield the emission from radiating away from the area of interest. RFID tags requiring bulk commissioning are often located in very confined space which may be shielded with relative ease. The inventive concept includes taking advantage of plural regulatory bands at as single installation.

SUMMARY

In an exemplary embodiment, the disclosure includes a method of commissioning RFID tags with a single reader having plural communications channels. The method includes the steps of at least one reader initiating a write sequence with a first tag by issuing a first write command to the first tag using a first communications channel operating within a first regulatory communications band; and, prior to receiving a response from the first tag to the first write command, that at least one reader initiates a write sequence with a second tag by issuing a second write command to is second tag using a second communications channel operating within a second regulatory communications band.

According to one embodiment, the plural communications are contained in a single reader and the method further includes transmitting across the first communications channel to the first tag and the second communications channel to the second tag, from as common antenna in the single reader. The method further includes coordinating the transmission across the plural communications channels by a common data processing hardware in the single reader to track the first communications channel with the first tag and the second communications channel with the second tag.

According to another embodiment, the plural communications are contained in a single reader and the method further includes transmitting across the first communications channel from a first antenna in the single reader to the first tag and transmitting across the second communications channel to the second tag from a second antenna in the single reader. The method further includes coordinating the transmission across the plural communications channels by a common data processing hardware in the single reader to track the first communications channel with the first tag and the second communications channel with the second tag.

According to another embodiment, the plural communications are contained in a single reader and the method further includes transmitting across the first communications channel to the first tag and the second communications channel to the second tag from a common antenna in the single reader. The method further includes coordinating the plural communications channels by a data processing hardware in the single reader to track the first communications channel with the first tag, and by another data processing hardware in the single reader to track the second communications channel in the second tag.

According to another embodiment, the plural communications are contained in a single reader and the method further includes transmitting across the first communications channel from a first antenna in the single reader to the first tag and transmitting across the second communications channel to the second tag from a second antenna in the single reader. The method further includes coordinating the plural communications channels by a data processing hardware in the single reader to track the first communications channel with the first tag and by another data processing hardware in the signal reader to track the second communications channel with the second tag.

According to another embodiment, the plural communications are contained in separate readers and the method further includes synchronizing the first communications channel contained in one reader with the second communications channel in another reader across at least one communications link between the separate readers. According to one aspect of the embodiment, the synchronization is conducted by a data processing hardware in the one reader and by another data processing hardware in the another reader.

Embodiments of the disclosure are also directed to a system for commissioning RFID tags using plural communications channels. The system includes at least a first tag and a second tag. The system further includes at least a first and second communications channel. The system further includes at least one reader, wherein the at least one reader initiates a write sequence with the first tag by issuing as first write command to the first tag using a first communications channel operating within as first regulatory communications band. The at least one reader, prior to a response from the first tag to the first write command, initiates a write sequence from the at least one reader with the second tag by issuing a second write command to the second tag using a second communications channel operating with in a second regulatory communications band.

According to one embodiment, the first and second communications channels are contained in a single reader and the system further includes a common antenna in the single reader, wherein the common antenna transmits across the first communications channel to the first tag and the second communications channel to the second tag. The system further includes a common data processing hardware in the single reader, wherein the common data processing hardware coordinates the transmission across the first and second communications channels to track the first communications channel with the first tag and the second communications channel with the second tag.

According to another embodiment, the first and second communications channels are contained in a single reader and the system further includes a first antenna in the single reader, wherein the first antenna transmits across the first communications channel from the first antenna to the first tag. The system further includes a second antenna in the single reader, wherein the second antenna transmits across the second communications channel to the second tag from the second antenna. The system further includes a common data processing hardware in the single reader, wherein the common data processing hardware coordinates the transmission across the first and second communications channels to track the first communications channel with the first tag and the second communications channel with the second tag.

According to another embodiment, the first and second communications channels are contained in a single reader and the system further includes a common antenna in the single reader, wherein the common antenna transmits across the first communications channel to the first tag and the second communications channel to the second tag. The system further includes a first data processing hardware in the single reader, wherein the first data processing hardware tracks the first communications channel with the first tag. The system further includes a second data processing hardware in the single reader, wherein the second data processing hardware tracks the second communications channel with the second tag. The first data processing hardware and the second data processing hardware coordinate the first and second communications channels for tracking the first and second tag.

According to another embodiment, the first and second communications channels are contained in a single reader and the system farther includes a first antenna in the single reader, wherein the first antenna transmits across the first communications channel to the first tag. The system further includes a second antenna in the single reader, wherein the second antenna transmits across the second communications channel to the second tag. The system further includes a first data processing hardware in the single reader, wherein the first data processing hardware tracks the first communications channel with the first tag. The system further includes a second data processing hardware in the single reader, wherein the second data processing hardware tracks the second communications channel with the second tag. The first data processing hardware and second data processing hardware coordinate the first and second communications channels for tracking the first and second tag.

According to another embodiment, the system further includes a second reader, wherein the first communications channel is contained in the at least one reader and the second communications channel is contained in the second reader. According to one aspect of the embodiment, the system further includes a communications link connected between the at least one reader and the second reader, wherein the first communications channel contained in the at least one reader and the second communications channel in the second reader are synchronized through the communications link by at least one data processing hardware in either or both of the at least one reader and the second reader.

According to another embodiment, each tag is selected from one of a passive RFID tag, semi-passive RFID tag, and active RFID tag. According to one aspect of the embodiment, the tag comprises a tag antenna for receiving information from the at least one reader and to respond to the at least one reader on the communications channel. The tag further includes a non-volatile memory for storing the information permanently or semi-permanently. The tag further includes a tag data processor for placing the information from the tag antenna to the non-volatile memory. The tag further includes a signal processing circuitry to link the tag antenna to the tag data processor to move the information form the tag antenna to the tag data processor.

DETAILED DESCRIPTION OF THE ILLUSTRATED EMBODIMENTS

Figure 1:
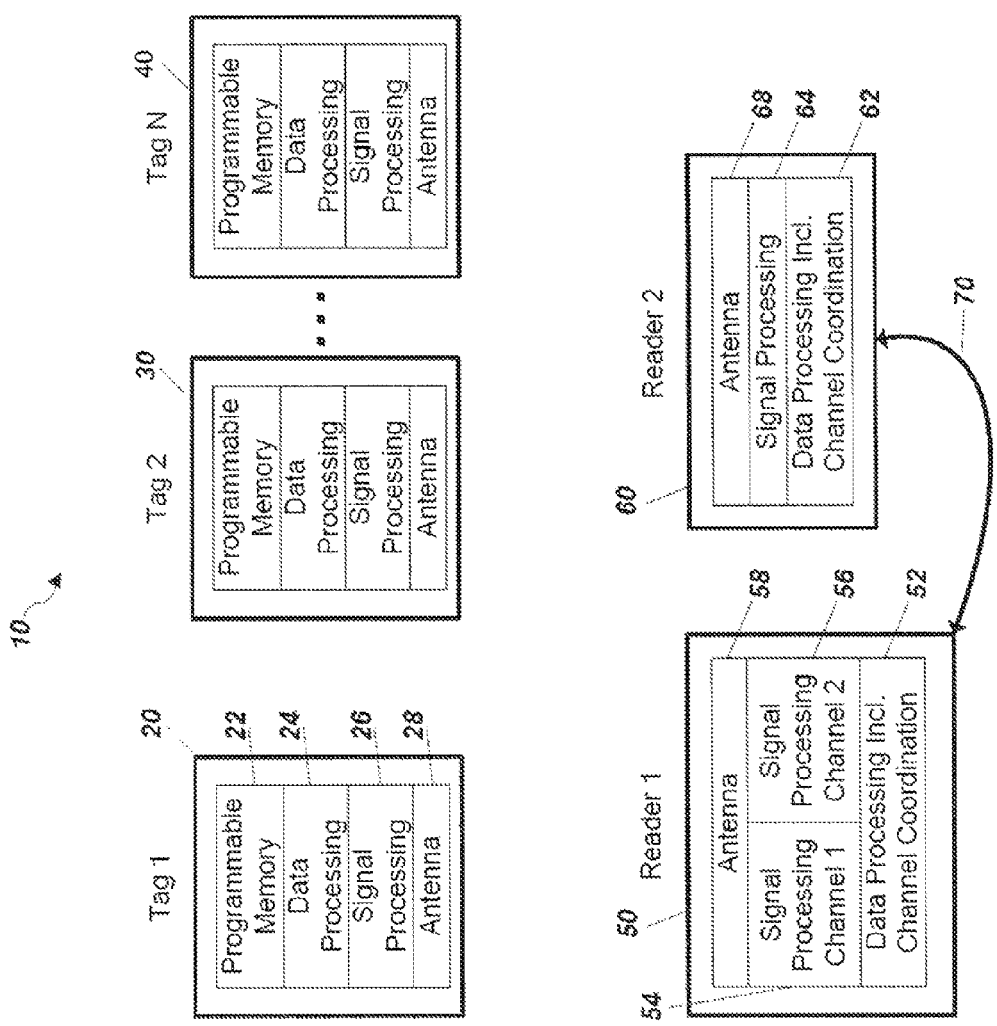
FIG. 1 is a system diagram of the present disclosure.

Rapid programming of plural RFID tags can be achieved by a single reader having plural communications channels. FIG. 1 is a block system diagram of an exemplary embodiment of the present disclosure showing the system 10 comprising two RFID readers 50 and 60, and a number of RFID tags 20, 30, and 40. Tag 1, (i.e., reference no. 20) comprises and antenna 28 (e.g., a loop or dipole or whatever is appropriate for its operating frequency, etc.) for receiving transmissions from a reader and for responding to the reader (e.g., via a transmission emanating from the tag, or via field absorption modulation/backscatter, etc.). Tag 1 also comprises signal processing circuitry 26 which forms a link between the antenna signals and the tags internal data processing 24. Lastly, the data processing hardware of Tag 1 comprises or is connected to a section of non-volatile memory 22 into which the data processing hardware 24 places information for permanent or semi-permanent storage in the tag. The other tags have features similar or identical to those in Tag 1.

Reader 1, (i.e., reference no. 50,) illustrates an embodiment of the disclosure wherein a single reader comprises two separate communications channels. The two transceiver channels 54 and 56 are here depicted as sharing both data processing 52 and a common antenna 58. Of course each channel could have separate antennas and data processing. At a minimum, the two channels must somehow be coordinated to track which channel is talking to which tag, etc. Here this is achieved by the common data processing hardware 52.

Reader 2, (i,e., reference no. 60,) and communications link 70 illustrate other optional embodiments of the disclosure. Reader 2 comprises only a single channel, which is made up of data processing hardware 62, signal processing 64, and an antenna 68. Here, rather than having a single reader embody the disclosure, the multi-channel function is accomplished by synchronizing the operations of the different readers via signals transmitted alone, communications link 70 which are generated and processed by the data processing units 52 and 62. From this it is easy to see that any number of tags could talk to any number of reader communications channels, and that the reader channels could be organized in any number of ways.

Figure 2:
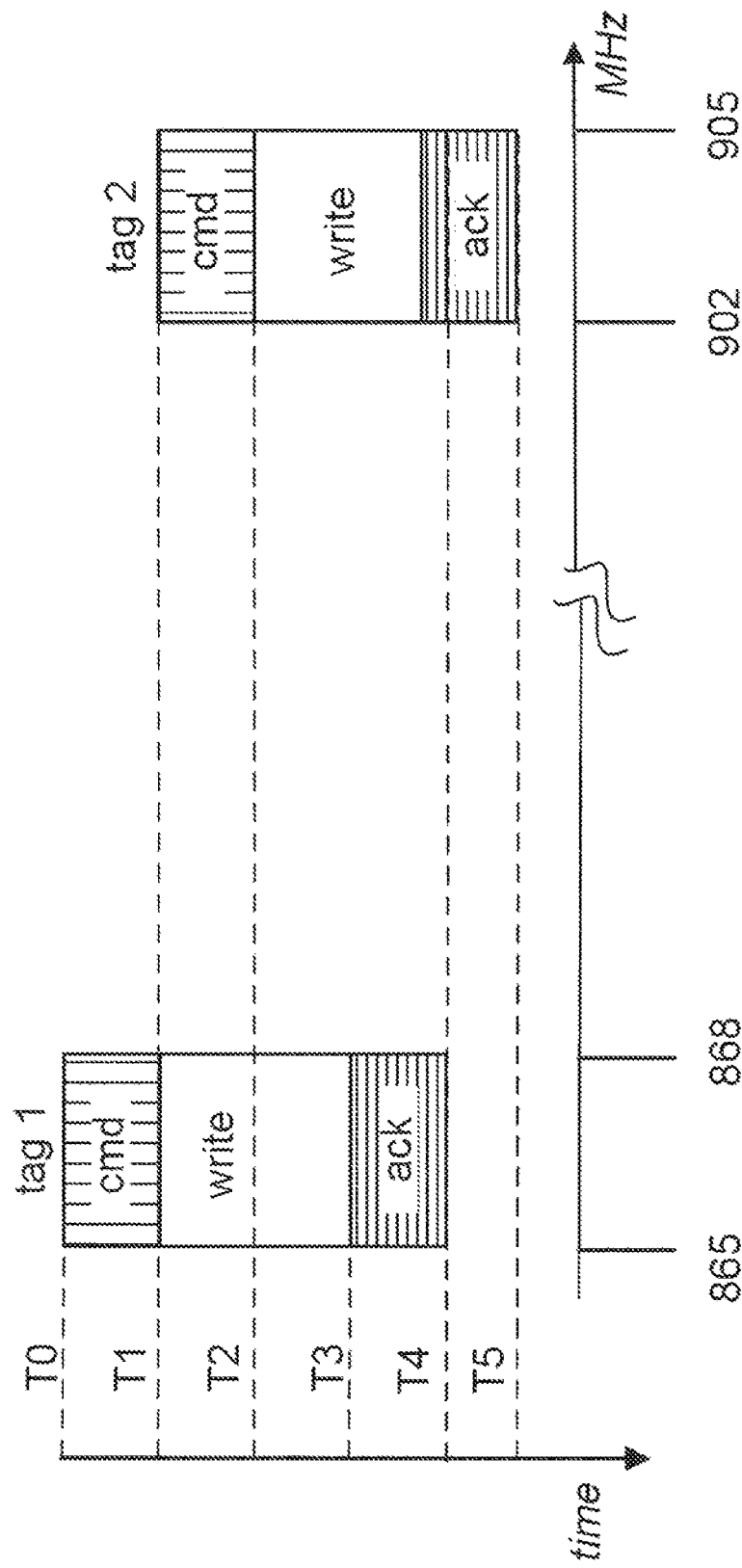
FIG. 2 is timing diagram depicting sequences of simultaneous communication events occurring in two separate regulatory bands.

FIG. 2 illustrates a potential timing sequence for two communications channels. At T0, the reader initiates a write sequence by issuing a write command over the air protocol to Tag 1. This communication takes place in a first regulatory band from 865 to 868 MHz using a first hardware communications channel. At T1, Tag 1 begins its internal write process, e.g., loading or burning the information indicated by the write command into the tag's non-volatile memory. This process may be slow relative to the time it takes the reader to issue a write command. In FIG. 2, the write process for Tag 1 takes from T1 to T3. During this time, the reader may provide uninterrupted power to Tag 1, as necessary, by transmitting an unmodulated carrier wave (CW) signal to Tag 1. This allows the first channel to remain open so that Tag 1 may respond, e.g., by backscatter modulation, at T3 when the write operation is complete.

Note that where the reader has a second hardware communications channel, it is not necessary to wait until an acknowledgment (ACK) at T4 to commence writing to Tag 2. At T1, the reader may immediately send a second write command, this time addressed to Tag 2, using the second hardware communications channel using a second regulatory band from 902 to 905 MHz. Tag 2 can then conduct its own write cycle commencing at T2. Due to the separation of the regulatory bands, the acknowledgement from Tag 1 to the reader at T3, which signifies that Tag 1 has completed its write cycle, will not interfere with the writing occurring in Tag 2. Nor must the reader wait until Tag 2 has completed sending its acknowledgement at T5 before commencing its next operation. For example, at T5, the reader could send a write command to a third tag (not shown) to begin its programming.

The tag operating frequencies are given by way of example only. It will be appreciated that the method is applicable to any frequency range of RFID tag. The tags may operate in any number of bands, such as those outlined in the ISO 18000 guidelines. These include but are not limited to low frequency (LF) tags operating near, e.g., 400 kHz, high frequency (HF) tags circa 13.56 MHz, ultra-high frequency (UHF) tags operating near 900 MHz, or microwave tags. Many tags today are capable of operating in plural regulatory bands. For instance, tags based upon NXP UCODE G2XM or G2XL integrated circuits have a bandwidth from 840 to 960 MHz and other features that allow them to operate under the different frequency emissions standards for UHF RFID in Japan, Europe, and the United States.

The inventive technique is applicable to passive, semi-passive, and active RFID tags alike. This is due to the non-volatile memory programming delays common to different integrated circuit technologies which are largely independent of how the tag is powered. For example, the write time for electrically programmable read-only memory (EPROM) can vary considerably, e.g., from 3 to 8.5 mS per byte. Sonic delay is associated with every non-volatile memory form, e.g., flash, FRAM, etc.

For example, just writing a 96-bit electronic product code (ePC) into a tag could take up to 25 mS. That is 25 times slower than the time it takes to read the same number back from the tag. The reader will be idle during approximately 24 mS of the write cycle if it is processing only a single tag.

Figure 3:
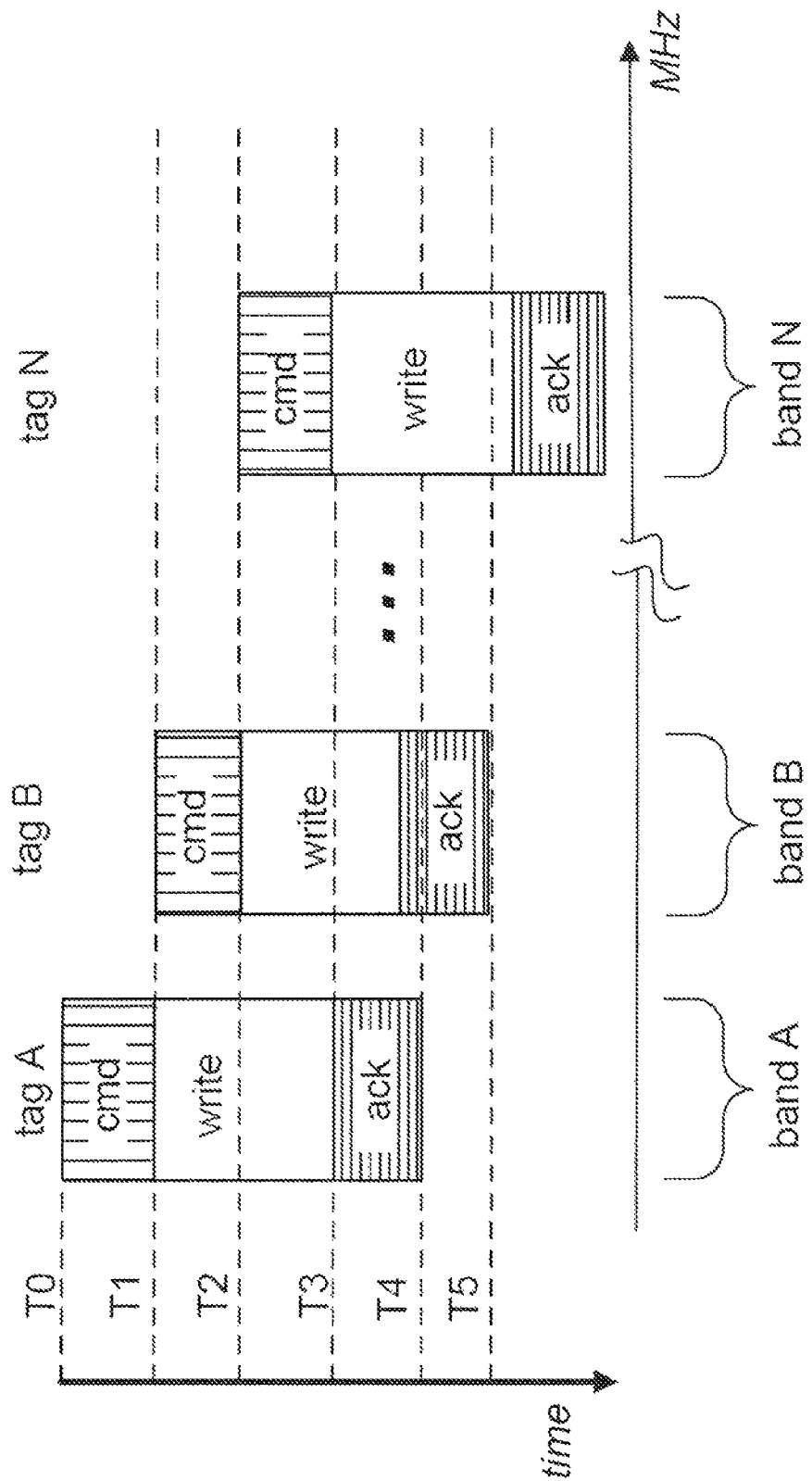
FIG. 3 is timing diagram depicting sequences of simultaneous communication events occurring in any number of separate regulatory bands.

As illustrated in FIG. 3, the inventive method is extendible to any number of regulatory bands. The communications channels for each band may reside in it single reader or several readers.

What is being claimed:

1. A method of commissioning RFID tags using plural communications channels, the method comprising the steps of:
    a) initiating, from a single reader having a first communications channel operating within a first regulatory communications band and a second communications channel operating within a second regulatory communications band, a write sequence with a first tag by issuing a first write command to the first tag using the first communications channel; and
    b) while continuing the write sequence with the first tag, simultaneously initiating, from the single reader, a write sequence with a second tag by issuing a second write command to the second tag using & the second communications channel.

2. The method according to claim 1 further comprising:
    transmitting across the first communications channel to the first tag and the second communications channel to the second tag from a common antenna in the single reader; and
    coordinating the transmission across the plural communications channels by a common data processing hardware in the single reader to track the first communications channel with the first tag and the second communications channel with the second tag.

3. The method according to claim 1 further comprising:
transmitting across the first communications channel from a first antenna in the single reader to the first tag and transmitting across the second communications channel to the second tag from a second antenna in the single reader; and
coordinating the transmission across the plural communications channels by a common data processing hardware in the single reader to track the first communications channel with the first tag and the second communications channel with the second tag.

4. The method according to claim 1 further comprising:
transmitting across the first communications channel to the first tag and the second communications channel to the second tag from a common antenna in the single reader; and
coordinating the plural communications channels by a data processing hardware in the single reader to track the first communications channel with the first tag, and by another data processing hardware in the signal reader to track the second communications channel with the second tag.

5. The method according to claim 1 further comprising:
transmitting across the first communications channel from a first antenna in the single reader to the first tag and transmitting across the second communications channel to the second tag from a second antenna in the single reader; and
coordinating the plural communications channels by a data processing hardware in the single reader to track the first communications channel with the first tag and by another data processing hardware in the signal reader to track the second communications channel with the second tag.

6. The method according claim 1, wherein the plural communications channels are used by separate readers.

7. The method according to claim 6 further comprising:
synchronizing the first communications channel used by one reader of the separate readers with the second communications channel used by another reader across at least one communication link between the separate readers.

8. The method according to claim 7, wherein the synchronization is conducted by a data processing hardware in the one reader of the separate readers and by another data processing hardware in the another reader.

9. The method according to claim 1, wherein each tag is selected from one of a passive RFID tag, semi-passive RFID tag, and active RFID tag.

10. A system for commissioning RFID tags using plural communications channels, the system comprising:
at least a first tag and a second tag;
at least a first and second communications channel; and
at least one reader, wherein a single reader initiates a write sequence with the first tag by issuing a first write command to the first tag using a first communications channel operating within a first regulatory communications band;
and wherein the single reader, while continuing the write sequence with the first tag, simultaneously initiates a write sequence with the second tag by issuing a second write command to the second tag using a second communications channel operating within a second regulatory communications band.

11. The system according to claim 10 further comprising:
a common antenna in the single reader, wherein the common antenna transmits across the first communications channel to the first tag and the second communications channel to the second tag; and
a common data processing hardware in the single reader, wherein the common data processing hardware coordinates the transmission across the first and second communications channels to track the first communications channel with the first tag and the second communications channel with the second tag.

12. The system according to claim 10 further comprising:
a first antenna in the single reader, wherein the first antenna transmits across the first communications channel from the first antenna to the first tag;
a second antenna in the single reader, wherein the second antenna transmits across the second communications channel to the second tag from the second antenna; and
a common data processing hardware in the single reader, wherein the common data processing hardware coordinates the transmission across the first and second communications channels to track the first communications channel with the first tag and the second communications channel with the second tag.

13. The system according to claim 10 further comprising:
a common antenna in the single reader, wherein the common antenna transmits across the first communications channel to the first tag and the second communications channel to the second tag;
a first data processing hardware in the single reader, wherein the first data processing hardware tracks the first communications channel with the first tag; and
a second data processing hardware in the single reader, wherein the second data processing hardware tracks the second communications channel with the second tag;
wherein the first data processing hardware and the second data processing hardware coordinate the first and second communications channels for tracking the first and second tag.

14. The system according to claim 10 further comprising:
a first antenna in the single reader, wherein the first antenna transmits across the first communications channel to the first tag;
a second antenna in the single reader, wherein the second antenna transmits across the second communications channel to the second tag;
a first data processing hardware in the single reader, wherein the first data processing hardware tracks the first communications channel with the first tag; and
a second data processing hardware in the single reader, wherein the second data processing hardware tracks the second communications channel with the second tag;
wherein the first data processing hardware and second data processing hardware coordinate the first and second communications channels for tracking the first and second tag.

15. The system of claim 10 further comprising a second reader, wherein the first communications channel is contained in the at least one reader and the second communications channel is contained in the second reader.

16. The system of claim 15 further comprising:
a communications link connected between the at least one reader and the second reader, wherein the first communications channel contained in the at least one reader and the second communications channel in the second reader are synchronized through the communications link by at least one data processing hardware in either or both of the at least one reader and the second reader.

17. The system of claim 10, wherein each tag is selected from one of a passive RFID tag, semi-passive RFID tag, and active RFID tag.

18. The system of claim 17, wherein the tag comprises:
a tag antenna for receiving information from the at least one reader and to respond to the at least one reader on the communications channel;
a non-volatile memory for storing the information permanently or semi-permanently;
a tag data processor for placing the information from the tag antenna to the non-volatile memory; and
a signal processing circuitry to link the tag antenna to the tag data processor to move the information from the tag antenna to the tag data processor.

* * * * *

UNITED STATES PATENT AND TRADEMARK OFFICE
CERTIFICATE OF CORRECTION

PATENT NO. : 9,508,034 B2
APPLICATION NO. : 13/622609
DATED : November 29, 2016
INVENTOR(S) : Heiko Doering Page 1 of 1

It is certified that error appears in the above-identified patent and that said Letters Patent is hereby corrected as shown below:

In the Claims

Column 6, Claim 1, Line 58 "write command to the second tag & using the second" should be --write command to the second tag using the second.--

Signed and Sealed this
Sixth Day of June, 2017

Michelle K. Lee
*Director of the United States Patent and Trademark Office*